United States Patent
Nakagawa et al.

(10) Patent No.: US 10,864,747 B2
(45) Date of Patent: Dec. 15, 2020

(54) INK JET RECORDING METHOD AND INK JET RECORDING APPARATUS

(71) Applicant: CANON KABUSHIKI KAISHA, Tokyo (JP)

(72) Inventors: Kouhei Nakagawa, Tokyo (JP);
Minako Kawabe, Koganei (JP);
Yoshihide Aikawa, Kawasaki (JP);
Hideyuki Saito, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/158,393

(22) Filed: Oct. 12, 2018

(65) Prior Publication Data
US 2019/0111703 A1     Apr. 18, 2019

(30) Foreign Application Priority Data

Oct. 17, 2017 (JP) .................. 2017-201259
Sep. 26, 2018 (JP) .................. 2018-180362

(51) Int. Cl.
| | |
|---|---|
| *B41J 2/21* | (2006.01) |
| *B41J 2/17* | (2006.01) |
| *C09D 11/32* | (2014.01) |
| *B41J 2/205* | (2006.01) |
| *B41J 2/165* | (2006.01) |
| *C09D 11/40* | (2014.01) |

(52) U.S. Cl.
CPC ......... *B41J 2/2107* (2013.01); *B41J 2/16588* (2013.01); *B41J 2/17* (2013.01); *B41J 2/2056* (2013.01); *B41J 2/2132* (2013.01); *C09D 11/32* (2013.01); *C09D 11/40* (2013.01)

(58) Field of Classification Search
CPC ...... B41J 2/2146; B41J 2/155; B41J 2202/20; B41J 2202/21; B41J 2/16585; B41J 29/38; B41J 2/17; B41J 2/21; B41J 2/2107; C09D 11/32
See application file for complete search history.

(56) References Cited

U.S. PATENT DOCUMENTS 7,208,033 B2   4/2007   Kawabe et al.
7,244,299 B2   7/2007   Tsuji et al.
(Continued)

FOREIGN PATENT DOCUMENTS

| JP | 2005-342982 A | 12/2005 |
| JP | 2009-018474 A | 1/2009 |
| JP | 2015-085552 A | 5/2015 |

*Primary Examiner* — Jannelle M Lebron
(74) *Attorney, Agent, or Firm* — Venable LLP (57) ABSTRACT

The ink jet recording method using an ink jet recording apparatus including: a first ink and a second ink; and a recording head including a plurality of recording element substrates in which a first ejection orifice array for ejecting the first ink and a second ejection orifice array for ejecting the second ink are sequentially arranged in a predetermined direction, wherein the plurality of recording element substrates are arranged to be adjacent to each other in a predetermined direction, includes: a recording step of ejecting the ink from the recording head disposed so that an angle formed between the ejection orifice surface of the recording head and the direction of gravity is 0° or more to less than 90° to record an image on the recording medium, wherein a brightness of the first ink is lower than a brightness of the second ink.

10 Claims, 4 Drawing Sheets

(56) References Cited

U.S. PATENT DOCUMENTS

| | | |
|---|---|---|
| 7,285,159 B2 | 10/2007 | Aikawa et al. |
| 7,294,184 B2 | 11/2007 | Fujimoto et al. |
| 7,445,325 B2 | 11/2008 | Aikawa et al. |
| 7,615,113 B2 | 11/2009 | Aikawa et al. |
| 7,637,603 B2 | 12/2009 | Kawabe et al. |
| 2008/0213493 A1* | 9/2008 | Mizutani ................ B41J 2/2132 427/426 |
| 2012/0218335 A1* | 8/2012 | Kondo ................... B41J 2/2132 347/13 |
| 2017/0232750 A1* | 8/2017 | Takino ................ B41J 2/16535 347/33 |
| 2018/0134907 A1 | 5/2018 | Saito et al. |

* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

Recently, an opportunity to use an ink jet recording apparatus in a commercial printing field and an office printing field has increased. In the commercial printing field and the office printing field, miniaturization of the ink jet recording apparatus is required. It has been studied to shorten a conveying distance of a recording medium by using a recording head in which an ejection orifice surface of the recording head is inclined with respect to the direction of gravity (see Japanese Patent Application Laid-Open No. 2015-85552 and Japanese Patent Application Laid-Open No. 2009-18474). Further, it has been studied to use a recording head including a plurality of recording element substrates having a plurality of ejection orifice arrays for ejecting a plurality of inks (see Japanese Patent Application Laid-Open No. 2015-85552).

The present inventors cause a recording head including a plurality of recording element substrates having a plurality of ejection orifice arrays for ejecting a plurality of inks while an ejection orifice surface of the recording head was inclined with respect to the direction of gravity to eject the ink, such that an image was recorded. As a result, it was found that a change in color tone of the image and image unevenness may occur due to color mixing of ink.

SUMMARY OF THE INVENTION

An object of the present invention is to provide an ink jet recording method capable of suppressing a change in color tone of an image and image unevenness due to color mixing even in a case in which the ink is ejected from a recording head including a plurality of recording element substrates having a plurality of ejection orifice arrays while an ejection orifice surface is inclined with respect to the direction of gravity. Another object of the present invention is to provide an ink jet recording apparatus using the ink jet recording method.

According to an embodiment of the present invention, there is provided an ink jet recording method using an ink jet recording apparatus including: a first ink and a second ink which are aqueous inks; and a recording head including a plurality of recording element substrates in which a first ejection orifice array for ejecting the first ink and a second ejection orifice array for ejecting the second ink are sequentially arranged from the bottom in the direction of gravity to be adjacent to each other and arranged to at least partially overlap each other in a conveying direction of a recording medium, wherein the plurality of recording element substrates are arranged to be adjacent to each other in an arrangement direction of the first ejection orifice array and the second ejection orifice array, the ink jet recording method including: a recording step of ejecting the aqueous ink from the recording head disposed so that an angle formed between the ejection orifice surface of the recording head and the direction of gravity is 0° or more to less than 90° to record an image on the recording medium, wherein a brightness of the first ink is lower than a brightness of the second ink.

According to another embodiment of the present invention, there is provided an ink jet recording apparatus including: a first ink and a second ink which are aqueous inks; and a recording head including a plurality of recording element substrates in which a first ejection orifice array for ejecting the first ink and a second ejection orifice array for ejecting the second ink are sequentially arranged from the bottom in the direction of gravity to be adjacent to each other and arranged to at least partially overlap each other in a conveying direction of a recording medium, wherein the plurality of recording element substrates are arranged to be adjacent to each other in an arrangement direction of the first ejection orifice array and the second ejection orifice array, wherein the aqueous ink is ejected from the recording head disposed so that an angle formed between the ejection orifice surface of the recording head and the direction of gravity is 0° or more to less than 90° to record an image on the recording medium, and a brightness of the first ink is lower than a brightness of the second ink.

According to the present invention, it is possible to provide an ink jet recording method capable of suppressing a change in color tone of an image and image unevenness due to color mixing even in a case in which the ink is ejected from a recording head including a plurality of recording element substrates having a plurality of ejection orifice arrays while an ejection orifice surface is inclined with respect to the direction of gravity.

In addition, it is possible to provide an ink jet recording apparatus capable of suppressing a change in color tone of an image and image unevenness due to color mixing even in a case in which the ink is ejected from a recording head including a plurality of recording element substrates having a plurality of ejection orifice arrays while an ejection orifice surface is inclined with respect to the direction of gravity.

Further features of the present invention will become apparent from the following description of exemplary embodiments with reference to the attached drawings.

DESCRIPTION OF THE EMBODIMENTS

Hereinafter, embodiments of the present invention are described in detail. In the present invention, hereinafter, in some cases, an aqueous ink is referred to as an "ink." Unless otherwise specified, various physical property values are values at a temperature of 25° C. "(Meth)acrylic acid" and "(meth)acrylate" are described as "acrylic acid and methacrylic acid" and "acrylate and methacrylate", respectively.

In an ink jet recording method of the present invention, a recording head in which a plurality of recording element substrates are arranged to be adjacent to each other in an arrangement direction of a plurality of ejection orifice arrays, is used. The reason is as follows.

In a case where the recording head includes the plurality of recording element substrates, discontinuous portions (hereinafter referred to as "joint portions") of the ejection orifice arrays exist at a boundary portion between the recording element substrates. When the image is recorded by using the recording head having the joint portion, a portion where ink is not ejected easily occurs on the image, and thus it is easily recognized as a "streak" (image streak).

In order to suppress occurrence of the image streak, it is known that a plurality of recording element substrates are arranged to constitute an overlapping portion in which the ejection orifices in the vicinity of the boundary of the recording element substrates overlap each other in the conveying direction of the recording medium. When the plurality of recording element substrates are arranged to overlap each other in the conveying direction of the recording medium, there are a case where the plurality of recording element substrates are arranged in a zigzag shape (FIG. 3A) and a case where the plurality of recording element substrates are arranged in a linear shape (FIG. 3B) in the arrangement direction of the plurality of ejection orifice arrays.

Here, in the case where the plurality of recording element substrates are arranged in the zigzag shape in the arrangement direction of the plurality of ejection orifice arrays, a distance between a first ejection orifice array and a second ejection orifice array in a non-overlapping portion where the ejection orifices do not overlap each other is regarded as $x_1$. In addition, in the case where the plurality of recording element substrates are arranged in the linear shape in the arrangement direction of the plurality of ejection orifice arrays, a distance between a first ejection orifice array and a second ejection orifice array in a non-overlapping portion where the ejection orifices do not overlap each other is regarded as $x_2$, wherein $x_1$ and $x_2$ are regarded as the same value. In addition, in the case where the plurality of recording element substrates are arranged in the zigzag shape in the arrangement direction of the plurality of ejection orifice arrays, a distance between a first ejection orifice array of the recording element substrate at a lower side in the direction of gravity and a second ejection orifice array of the recording element substrate at an upper side in the direction of gravity in the overlapping portion is regarded as $y_1$. In a case where the plurality of recording element substrates are arranged in the linear shape in the arrangement direction of the plurality of ejection orifice arrays, a distance between a first ejection orifice array of the recording element substrate and a second ejection orifice array of the recording element substrate adjacent to the recording element substrate in the overlapping portion is regarded as $y_2$.

In a case where the plurality of recording element substrates are arranged in the zigzag shape, a difference between the distance between two kinds of ejection orifice arrays in the non-overlapping portion and the distance between two kinds of ejection orifice arrays in the overlapping portion is represented by $y_1-x_1$. In addition, when the plurality of recording element substrates are arranged in the linear shape, a difference between the distance between two kinds of ejection orifice arrays in the non-overlapping portion and the distance between two kinds of ejection orifice arrays in the overlapping portion is represented by $y_2-x_2$, and thus a relationship $y_1-x_1>y_2-x_2$ is established. When a conveying speed of the recording medium is constant, if the distance between the two kinds of ejection orifice arrays is large, it means that the difference in application time to the recording medium of two kinds of inks becomes large. Therefore, when the difference in distance between two kinds of ejection orifice arrays in the non-overlapping portion and the overlapping portion is large, the difference in application time to the recording medium of two kinds of inks in the non-overlapping portion and the overlapping portion becomes large. In other words, in the case where the plurality of recording element substrates are arranged in the zigzag shape as compared with the case where the plurality of recording element substrates are arranged in the linear shape, the difference in application time to the recording medium of two kinds of inks in the non-overlapping portion and the overlapping portion becomes large. In this case, "unevenness" (image unevenness) tends to occur between the image recorded in the non-overlapping portion and the image recorded in the overlapping portion. The reason is as follows.

When the difference in application time between the two kinds of inks is small, the second ink is applied while drying of the first ink applied to the recording medium has not progressed, and thus the second ink easily bleeds. Meanwhile, when the difference in application time between the two kinds of inks is large, the second ink is applied after the drying of the first ink applied to the recording medium has progressed, and thus it is difficult for the second ink to bleed. When the difference in ink application time in the non-overlapping portion and the overlapping portion is large, the ease of bleeding of the second ink on the recording medium is greatly different, and thus colors that can be recognized between an image recorded in the non-overlapping portion and an image recorded in the overlapping portion differ. As a result, image unevenness occurs.

In order to suppress the image unevenness, it is important to make the difference in application time of the ink in the non-overlapping portion and the difference in application time of the ink in the overlapping portion smaller. Therefore, in the ink jet recording method of the present invention, the recording head in which the plurality of recording element substrates are arranged in a linear shape (adjacent arrangement) in the arrangement direction of the plurality of ejection orifice arrays is used.

Figure 1A:
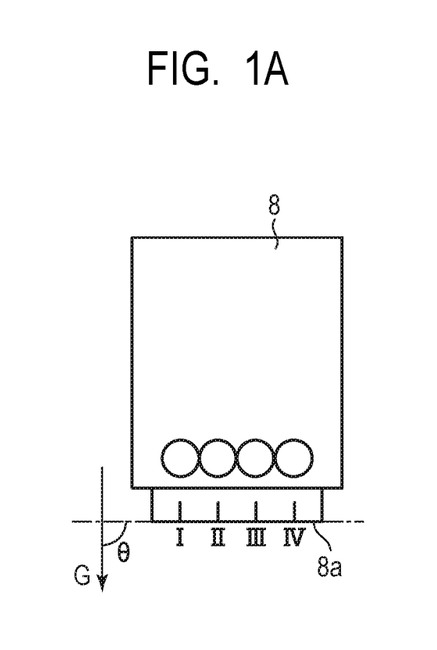
FIG. 1A, which is a view for describing a relationship between an ejection orifice surface of a recording head and the direction of gravity, is a view illustrating a case in which an angle formed between the ejection orifice surface of the recording head and the direction of gravity is 90°.
Figure 1B:
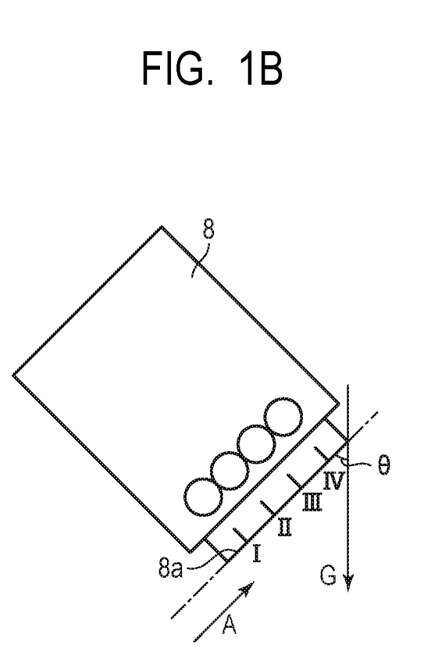
FIG. 1B, which is a view for describing a relationship between an ejection orifice surface of a recording head and the direction of gravity, is a view illustrating a case in which an angle formed between the ejection orifice surface of the recording head and the direction of gravity is 45°.
Figure 1C:
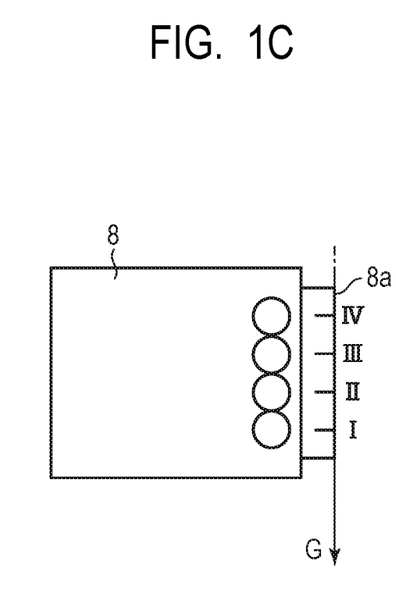
FIG. 1C, which is a view for describing a relationship between an ejection orifice surface of a recording head and the direction of gravity, is a view illustrating a case in which an angle formed between the ejection orifice surface of the recording head and the direction of gravity is 0°.

FIGS. 1A to 1C are views illustrating a relationship between an ejection orifice surface of a recording head 8 and the direction of gravity. FIG. 1A is a view illustrating a case in which an angle formed between the ejection orifice surface 8a of the recording head 8 and the direction of gravity is 90°. FIG. 1B is a view illustrating a case in which an angle formed between the ejection orifice surface 8a of the recording head 8 and the direction of gravity is 45°. FIG. 1C is a view illustrating a case in which an angle formed between the ejection orifice surface 8a of the recording head 8 and the direction of gravity is 0°. In FIGS. 1A to 1C, θ represents the angle formed between the ejection orifice surface 8a of the recording head 8 and the direction of gravity (arrow G in FIGS. 1A to 1C). In a general ink jet recording method, as illustrated in FIG. 1A, ink is ejected from the recording head 8 in which the ejection orifice surface 8a of the recording head 8 is formed at an angle of 90° with respect to the direction of gravity, that is, the ejection orifice surface 8a is substantially perpendicular to the direction of gravity, such that an image is recorded. However, in an ink jet recording method according to the present invention, ink is ejected from the recording head 8 in which the ejection orifice surface 8a of the recording head 8 is formed at an angle of 0° or more to less than 90° with respect to the direction of gravity, that is, the ejection orifice surface 8a is inclined with respect to the direction of gravity, such that an image is recorded. As illustrated in FIG. 1C, the ejection orifice surface 8a of the recording head 8 may be formed at an angle of 0° with respect to the direction of gravity, that is, the ejection orifice surface 8a may be substantially parallel with the direction of gravity.

It was found that when a recording head including a plurality of recording element substrates having a plurality of ejection orifice arrays while an ejection orifice surface is inclined with respect to the direction of gravity is used, particularly, at the time of continuously recording the images at high speed, the change in color tone of the image due to color mixing occurred. The reason is as follows. Here, as an example, a description is provided while focusing on adjacent ejection orifice arrays I and II of the recording head having the ejection orifice surface in which four ejection orifice arrays I to IV are formed as illustrated in FIG. 1B. An ejection orifice group forming each of the ejection orifice arrays is disposed to be substantially orthogonal to a conveying direction (an arrow A in FIG. 1B) of a recording medium. The recording medium is conveyed in an arrow A direction, and ink is ejected onto the recording medium in a sequence of the ejection orifice arrays I and II.

When the image is continuously recorded, the ink overflowed at the time of ejecting the ink is likely to a periphery of the ejection orifice. Furthermore, in addition to a main ink droplet, small accompanying ink droplets (hereinafter, referred to as "mist") increase, and the mist is likely to adhere to the periphery of the ejection orifice. As a result, when the ink is ejected from the ejection orifice array II, the ink tends to adhere to the periphery of the ejection orifice constituting the ejection orifice array II.

The phenomenon that the ink tends to adhere to the periphery of the ejection orifice constituting the ejection orifice array II is a phenomenon generated even in a general ink jet recording method in which the ink is ejected from the recording head 8 of which the ejection orifice surface 8a is perpendicular to the direction of gravity, such that the image is recorded. In this case, color mixing of ink did not occur. Color mixing of ink is a problem that occurs when the image is recorded using the recording head 8 in which the ejection orifice surface 8a of the recording head 8 is inclined with respect to the direction of gravity.

When the image is recorded using the recording head in which the ejection orifice surface of the recording head is inclined with respect to the direction of gravity, in the peripheries of the ejection orifices, force in the direction of gravity is applied to ink adhered in a direction of the ejection orifice array I. Therefore, in the peripheries of the ejection orifices constituting the ejection orifice array II, the ink tends to accumulate in the direction of the ejection orifice array I. In the case of continuously recording the image, the ink further accumulates in the direction of the ejection orifice array I in the peripheries of the ejection orifices constituting the ejection orifice array II. Then, an ink meniscus formed at the ejection orifice of the ejection orifice array II is destroyed, whereby the ink overflows, and the ink ejected from the ejection orifice array II flows along the ejection orifice surface. The ink ejected from the ejection orifice array II enters the ejection orifice array I, and the change in color tone of the image to be recorded due to the color mixing of the ink ejected from the ejection orifice array I occurs.

Further, in the recording head including the recording element substrate in which the ejection orifice arrays I and II are arranged to at least partially overlap each other in the conveying direction of the recording medium, the ink ejected from the ejection orifice array II tends to enter the ejection orifice array I. As a result, the change in color tone of the image occurs due to color mixing of the ink ejected from the ejection orifice array I.

The present inventors focused on a relationship between the brightness of the ink ejected from two adjacent ejection orifice arrays in order to suppress the change in color tone of the image due to the color mixing of the ink. The color mixing of ink is easily noticed when ink having lower brightness between two kinds of inks enters ink having higher brightness. Meanwhile, the color mixing of ink is difficult to be noticed when the ink having higher brightness enters the ink having lower brightness. Therefore, among the inks ejected from two adjacent ejection orifice arrays, if the ink ejected from the ejection orifice array arranged at a lower side in the direction of gravity is ink having lower brightness, the ink having higher brightness enters the ink having lower brightness. Therefore, it is possible to reduce the change in color tone of the image, such that the color mixing is difficult to be noticed. As a result, it is possible to suppress the change in color tone of the image due to the color mixing of the ink.

<Ink Jet Recording Method>

In the recording head used in the present invention, first and second ejection orifice arrays for ejecting first and second inks are sequentially arranged from the bottom in the direction of gravity to be adjacent to each other. In addition, the brightness of the first ink is lower than the brightness of the second ink. Even in a case in which the recording head includes another ejection orifice array (third ejection orifice array or fourth ejection orifice array), as described below, it is preferable that the relationship between the brightness of adjacent respective ejection orifice arrays is satisfied. As a result, it is possible to suppress the change in color tone of the image due to the color mixing of the ink.

A recording head is used, in which a third ejection orifice array for ejecting a third ink which is an aqueous ink is further arranged at an adjacent position of the second ejection orifice array of the recording head, and at the same time, the second ejection orifice array and the third ejection orifice array are arranged to at least partially overlap each other in the conveying direction of the recording medium. In the recording head, the first ejection orifice array, the second ejection orifice array, and the third ejection orifice array are sequentially arranged from the bottom in the direction of gravity to be adjacent to each other. In addition, it is preferable that a brightness of the second ink is lower than a brightness of the third ink.

A recording head is used, in which a fourth ejection orifice array for ejecting a fourth ink which is an aqueous ink is further arranged at an adjacent position of the third ejection orifice array of the recording head, and at the same time, the third ejection orifice array and the fourth ejection orifice array are arranged to at least partially overlap each other in the conveying direction of the recording medium. In the recording head, the first ejection orifice array, the second ejection orifice array, the third ejection orifice array, and the fourth ejection orifice array are sequentially arranged from the bottom in the direction of gravity to be adjacent to each other. Further, it is preferable that a brightness of the third ink is lower than a brightness of the fourth ink.

Further, colors of the first ink and the second ink may be different from or the same as each other. When the colors of the first ink and the second ink are different from each other, color mixing in the image to be recorded is easily noticed, but even in this case, color mixing in the image can be suppressed by adopting a configuration according to the present invention. The colors of the first ink and the second ink can be selected from black, cyan, magenta, yellow, and the like. In the case of different colors, the first ink and the second ink are preferably combinations of two inks selected from the group consisting of black, cyan, magenta, and yellow inks. In the case of the same color, the first ink and the second ink are related to a dark ink and a light ink. The combination of the first ink and the second ink is preferably one selected from the group consisting of a combination of a dark ink having a black color (black ink) and a light ink having the black color (grey ink), a combination of a dark ink having a cyan color (cyan ink) and a light ink having the cyan color (light cyan ink), and a combination of a dark ink having a magenta color (magenta ink) and a light ink having the magenta color (light magenta ink).

<Ink Jet Recording Apparatus>

Hereinafter, in FIGS. 2 to 4B, an X direction refers to a horizontal direction, a Y direction refers to a depth direction of an ink jet recording apparatus, and a Z direction refers to a vertical direction.

Figure 2:
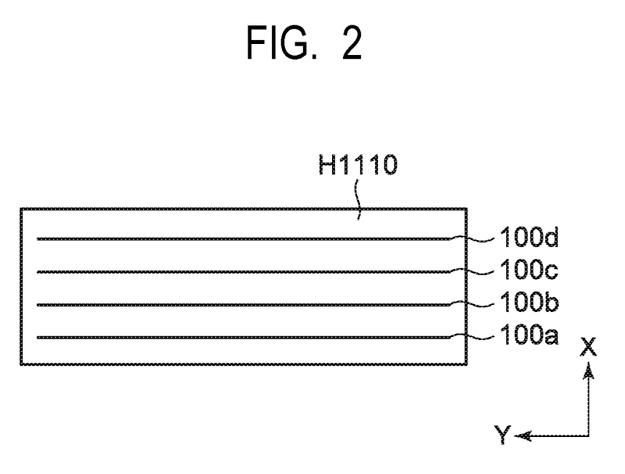
FIG. 2 is a schematic view of an example of a recording element substrate.

FIG. 2 is a schematic view of an example of a recording element substrate. FIG. 2 illustrates the recording element substrate H1110 having the four ejection orifice arrays 100a to 100d arranged in the Y direction. The ejection orifice surface 8a of the recording head 8 is a surface provided with the recording element substrate H1110 having the ejection orifice arrays. The recording element substrate H1110 may have the plurality of ejection orifice arrays. For example, in the case in which the single recording element substrate H1110 has four election orifice arrays, four kinds of inks such as cyan, magenta, yellow and black (CMYK) inks are ejected from four ejection orifice arrays, respectively.

A distance (mm) between an ejection orifice array constituted by ejection orifices ejecting one kind of ink and an ejection orifice array constituted by ejection orifices ejecting another kind of ink is preferably 0.1 mm or more to 1.5 mm or less and more preferably, 0.1 mm or more to 1.0 mm or less. More preferably, the distance is 0.3 mm or more to 1.0 mm or less. Here, the distance between the ejection orifice arrays is a distance between a line connecting the center of each ejection orifice ejecting one kind of ink and a line connecting the center of each ejection orifice ejecting another kind of ink. In the case in which there are a plurality of ejection orifice arrays for ejecting one kind of ink, the distance between an ejection orifice array composed of ejection orifices ejecting one kind of ink and an ejection orifice array composed of ejection orifices ejecting another kind of ink. The ejection arrays are spaced at the nearest distance in the X direction.

When the distance between the ejection orifice arrays is short, since the ejection orifice arrays are densely arranged, a higher quality image can be recorded, but since color mixing of the ink from the ejection orifice to another ejection orifice easily occurs, a problem such as a change in color tone of the image significantly occurs. Even in this case, it is possible to suppress the change in color tone of the image due to color mixing of the ink by adopting the constitution of the present invention.

A long diameter (μm) passing through the center of the ejection orifice of the recording head 8 is preferably 10 μm or more to 50 μm or less. Further, an ejection amount (ng) of the one ink droplet ejected from the recording head 8 is preferably 8.0 ng or less. When the ejection amount is more than 8.0 ng, since at the time of ejecting the ink, the ink easily overflows and thus the mist is easily increased, the ink more easily adheres to the periphery of the ejection orifice. Therefore, color mixing of the ink may easily occur, such that the change in color tone of the image may not be sufficiently suppressed in some cases. The ejection amount (ng) is more preferably 2.0 ng or more.

The recording head includes a plurality of recording element substrates. In the case of using the recording head including the plurality of recording element substrates H1110, a recording head in which a plurality of recording element substrates H1110 are arranged so as to correspond a width of the recording medium in the Y direction in FIG. 2, that is, a line head is preferably used. In the case of using the recording head including the plurality of recording element substrates H1110, it is preferable to arrange the plurality of recording element substrates H1110 so that the ejection orifices overlap each other in the conveying direction of the recording medium. In this way, it is possible to suppress image streaks due to the presence of the joint portions between the recording element substrates. However, since the ejection orifices overlap each other, color mixing of the ink from the ejection orifice to another ejection orifice easily occurs, and thus the problem such as the change in color tone of the image significantly occurs. Even in this case, it is possible to suppress the change in color tone of the image due to the color mixing of the ink by adopting the constitution of the present invention.

Figure 3A:
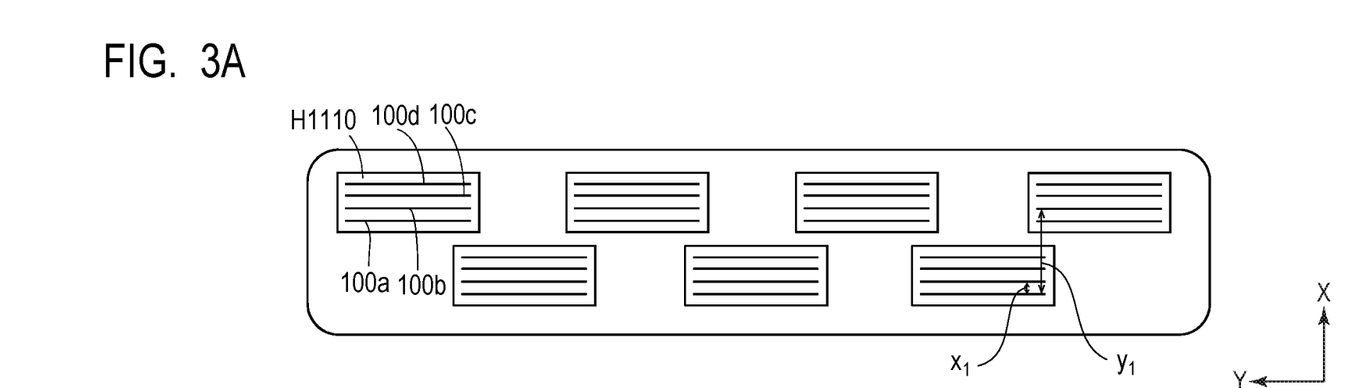
FIG. 3A, which is a view for describing an example of a line head, is a schematic view of a line head in which the recording element substrates are arranged in a zigzag shape (non-adjacent arrangement) in an arrangement direction of a plurality of ejection orifice arrays.
Figure 3B:
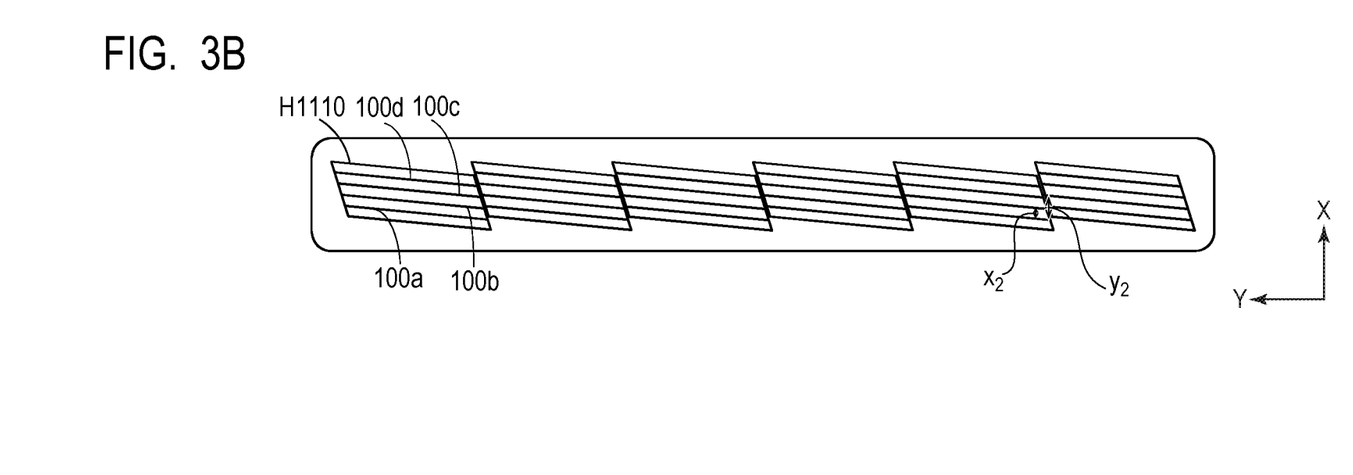
FIG. 3B, which is a view for describing an example of a line head, is a schematic view of a line head in which the recording element substrates are arranged in a linear shape (adjacent arrangement) in an arrangement direction of a plurality of ejection orifice arrays.

FIGS. 3A and 3B are schematic views of line heads. FIG. 3A is a schematic view of a line head in which the recording element substrates H1110 are arranged in a zigzag shape (non-adjacent arrangement) in an arrangement direction of a plurality of ejection orifice arrays. FIG. 3B is a schematic view of a line head in which the recording element substrates H1110 are arranged in a linear shape (adjacent arrangement) in an arrangement direction of a plurality of ejection orifice arrays. In FIGS. 3A and 3B, a plurality of recording element substrates H1110 are arranged on a support substrate. In the ink jet recording method according to the present invention, it is preferable to use a line head in which the plurality of recording element substrates H1110 are arranged in a linear shape. Further, an example of a shape of the recording element substrate H1110 may include a parallelogram, a rectangle, a trapezoid and other shapes, but the parallelogram is preferable.

As a method of ejecting the ink, a method of applying mechanical energy to the ink, a method of applying heat energy to the ink, and the like, can be used. Among those, as the method of ejecting the ink, the method of applying heat energy to the ink is preferably used.

Figure 4A:
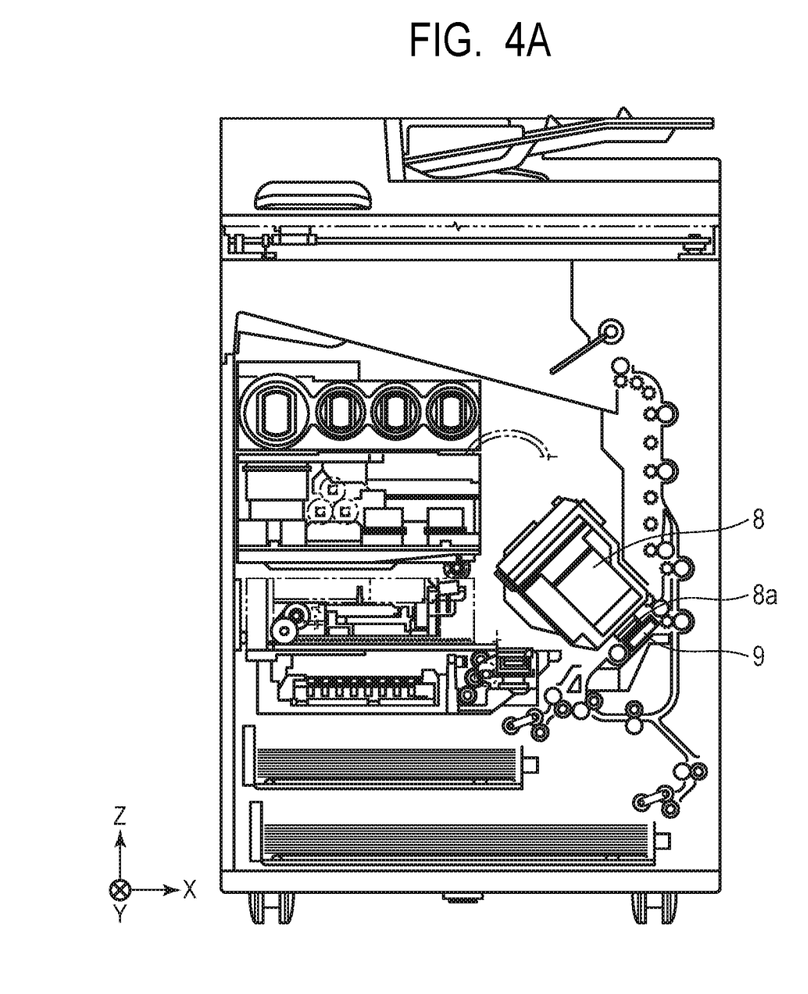
FIG. 4A, which is a view for describing an example of an ink jet recording apparatus, is a cross-sectional view of an entire apparatus.
Figure 4B:
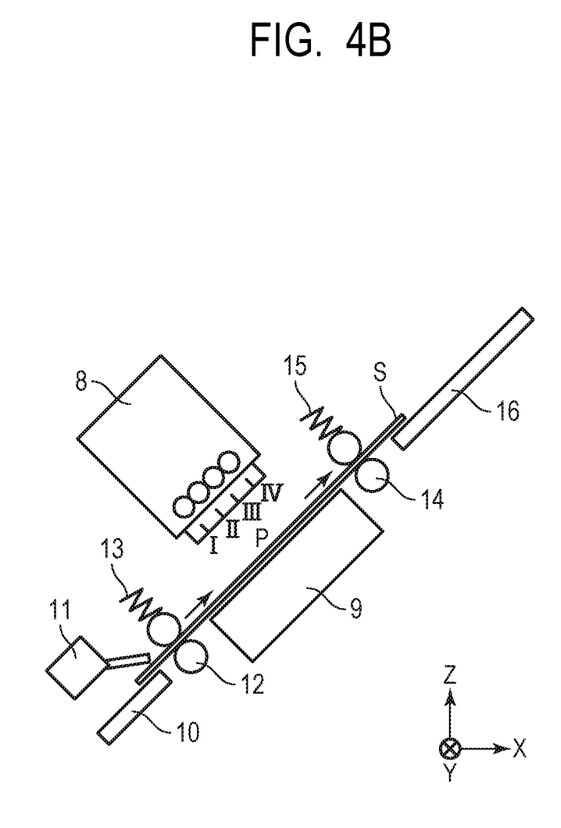
FIG. 4B, which is a view for describing an example of an ink jet recording apparatus, is an enlarged view of a portion around the recording head.

FIGS. 4A and 4B are schematic views of an example of an ink jet recording apparatus, wherein FIG. 4A is a cross-sectional view of an entire apparatus, and FIG. 4B is an enlarged view of a portion around the recording head. As illustrated in FIGS. 4A and 4B, in order to miniaturize the apparatus, it is preferable to use an ink jet recording apparatus capable of recording an image by a single recording head 8 capable of ejecting a plurality of kinds of inks instead of recording the image by a plurality of recording heads corresponding to the plurality of kinds of inks. At the time of ejecting the ink to record an image, as illustrated in FIGS. 4A and 4B, an angle formed between an ejection orifice surface 8a of the recording head 8 and the direction of gravity is 0° or more to less than 90° and the ink is ejected from the recording head 8 inclined with respect to the direction of gravity, such that the image is recorded.

In addition, at the time of ejecting the ink to record the image, a difference between an angle formed between a recording medium S and the direction of gravity and the angle formed between the ejection orifice surface 8a of the recording head 8 and the direction of gravity is preferably ±5° or less and more preferably 0°. That is, a difference between a distance between ejection orifices forming an ejection orifice array I and the recording medium S and a distance between ejection orifices forming an ejection orifice array IV and the recording medium S is preferably ±1 mm or less and more preferably 0 mm. Here, the distance between the ejection orifice and the recording medium S is a distance between the center of the ejection orifice and a position at which a line intersects the recording medium S when the line is extended from the center of the ejection orifice in the direction of gravity. As described above, by setting the conveying direction of the recording medium S at the time of recording an image to the above conditions, a conveying distance of the recording medium S in the X direction is also shortened, thereby making it possible to miniaturize the apparatus. In order to further shorten the conveying distance of the recording medium S in the X direction, the angle formed between the ejection orifice surface 8a of the recording head 8 and the direction of gravity is 10° or more to 80° or less, and more preferably 30° or more to 60° or less.

The ejection orifice surface 8a of the recording head 8 faces a platen 9. In FIGS. 4A and 4B, a plane of the platen 9 is inclined at about 45° with respect to the direction of gravity, and the ejection orifice surface 8a of the recording head 8 is also inclined at about 45° with respect to the direction of gravity so that a distance from the platen 9 is constantly maintained. When the ink jet recording apparatus does not perform a recording operation, the angle formed between the ejection orifice surface 8a of the recording head 8 and the direction of gravity is 90°.

Further, a conveyance path of the recording medium S at the time of recording an image is described. In FIG. 4B, the recording medium S is guided by a first guide 10, and a tip position of the recording medium S is detected by a paper sensor 11. The recording medium S is conveyed toward a recording region P between the recording head 8 and the platen 9 while being sandwiched between a first conveying roller 12 and a first pinch roller 13 constituted by a spur biased by a spring, and the like. In the recording region P, the ink is ejected from the plurality of ejection orifice arrays I to IV in the recording head 8 to the recording medium S. A rear surface of the recording medium S in the region to which the ink is applied is supported by the platen 9, and the distance between the ejection orifice surface 8a and the recording medium S is constantly maintained. After the ink is applied, the recording medium S is guided by a second guide 16 while being sandwiched between a second conveying roller 14 and a second pinch roller 15, such that the recording medium S is conveyed.

The conveying direction of the recording medium at the time of recording the image may be a direction opposite to a direction shown in FIG. 4B; however, the recording medium after recording the image is discharged to an upper part of the recording apparatus by conveying the recording medium from the bottom to the top in the direction of gravity as shown in FIG. 4B, and thus it is easy for the user to take the recording medium. However, when the recording medium is conveyed from the bottom to the top in the direction of gravity, the vicinity of the ejection orifice array I arranged at the bottom in the direction of gravity is decompressed. As a result, air resistance in the vicinity of the ejection orifice array I is reduced, and thus the ink ejected subsequently from the ejection orifice array II is drawn in a direction of the ejection orifice array I in which the air resistance is reduced. In this manner, when the ink is ejected from the ejection orifice array II, the ink is drawn in the direction of the ejection orifice array I, and thus the ink tends to adhere toward the direction of the ejection orifice array I around the ejection orifice array constituting the ejection orifice array II. Therefore, due to the color mixing of the ink, the problem of change in color tone of the image significantly occurs. Even in this case, it is possible to suppress the change in color tone of the image due to the color mixing of the ink by adopting the constitution of the present invention. In addition, it is preferable that the conveying direction of the recording medium at the time of recording the image is a direction intersecting an arrangement direction of the ejection orifice arrays I to IV.

In order to suppress a variation in the ejection amount of the ink, it is preferable to preheat the ink before ejecting the ink based on image data. This preheating is an operation of heating the ink using a heating element present in the vicinity of the recording element for ejecting the ink. Since a viscosity of the ink is easily lowered by heating the ink, the ink ejected from the ejection orifice is likely to flow along the ejection orifice surface 8a, and color mixing of the ink easily occurs. As a result, the problem of change in color tone of the image significantly occurs. Even in this case, it is possible to suppress the change in color tone of the image due to the color mixing of the ink by adopting the constitution of the present invention.

Further, it is preferable that the ejection orifice surface 8a of the recording head 8 is subjected to water-repellent treatment. In this way, since a contact angle between the ink adhered to the periphery of the ejection orifice and the ejection orifice surface 8a is increased, the ink droplets easily become granular. Therefore, it is hard for the ink to flow along the ejection orifice surface in the direction of gravity and the change in color tone of the image due to the color mixing of the ink can be further suppressed.

As a method of performing water-repellent treatment on the ejection orifice surface 8a, a method of applying a water-repellent material with a spray, a method of adhering a water-repellent material by vacuum deposition or plasma polymerization and the like can be selected. Water-repellency of the formed ejection orifice surface 8a can be determined by measuring a contact angle of a water droplet on a surface of the member. When the contact angle of the water droplet is 70° or more, the member can be said to have water-repellency, and it is preferable that the contact angle of the water droplet is 90° or more. Further, the contact angle of the water droplet can be measured using pure water (ion exchange water) and a general contact angle meter. As an example of the contact angle meter, an automatic contact angle measuring device (CA-W, Kyowa Interface Science Co., Ltd.) can be used.

As an example of the water-repellent material, a fluororesin based compound is preferably used. Particularly, it is preferable that a water-repellent surface is formed as a uniform resin film made of the fluororesin based compound, and it is preferable that the resin film does not contain a metal such as nickel or the like. Examples of the fluororesin based compound include a polytetrafluoroethylene resin, a fluororesin having a cyclic structure and the like. Specific examples thereof can include Polyflon PTFE (manufactured by Daikin Industries Ltd), Teflon (registered trademark) PTFE (manufactured by DuPont), Cytop (manufactured by AGC), and the like. In addition, other fluorine atom-containing resins such as fluorinated epoxy resins, fluorinated polyimide resins, fluorinated polyamide resins, fluorinated acrylic resins, fluorinated urethane resins, fluorinated siloxane resins, and modified resins thereof can also be used. Further, as the water-repellent material, compounds containing a silicon atom or silicone based resins may be used.

Particularly, in view of obtaining high water-repellency and durability, as the water-repellent material, it is preferable to use a hydrolyzable silane compound having a fluoroalkyl group and a condensate of a hydrolyzable silane compound having a cationic polymerizable group. Further, a resin obtained by curing the condensate by irradiation with an active energy ray such as ultraviolet ray or the like may also be used. These hydrolyzable silane compounds have a hydrolyzable group in their molecular structure. An example of the hydrolyzable group can include an alkoxy group. Further, examples of the cationic polymerizable group can include a cyclic ether group, a cyclic vinyl ether group and the like.

The ink jet recording apparatus may include a unit for applying a reaction liquid containing a reaction agent for aggregating a coloring material in the ink onto the recording medium S. Examples of the unit for applying the reaction liquid onto the recording medium S may include a unit for applying the reaction liquid onto the recording medium S with a roller or the like, a unit for ejecting the reaction liquid from an ink jet type recording head 8 and the like. The ink jet recording apparatus of the present invention needs not to have to include an irradiation unit of an energy ray.

<Ink>

Hereinafter, each component constituting the ink used in the present invention is described in detail. The inks used in the present invention may not contain compounds polymerized by irradiation with an energy ray.

(Coloring Material)

The ink preferably contains a coloring material. As the coloring material, a dye and a pigment can be used. A content of the coloring material in the ink is preferably 0.1% by mass or more to 15.0% by mass or less and more preferably 1.0% by mass or more to 11.0% by mass or less based on a total mass of the ink.

As the dye, it is preferable to use dye having an anionic group. Specific examples of the dye may include azo, triphenylmethane, (aza)phthalocyanine, xanthene, anthrapyridone, and the like.

As a dispersion method of the pigment, a resin-dispersed pigment using a resin as a dispersant, a self-dispersible pigment in which a hydrophilic group is bonded to a particle surface of the pigment, and the like can be used. Further, a resin-bonded pigment in which an organic group containing a resin is chemically bonded to a particle surface of the pigment, and a microcapsule pigment in which a particle surface of the pigment is coated with a resin, or the like can also be used. It is possible to use pigments of which dispersion methods are different from each other in combination.

Specific examples of the pigment can include inorganic pigments such as carbon black and titanium oxide, and the like; and organic pigments such as azo, phthalocyanine, quinacridone, isoindolinone, imidazolone, diketopyrrolopyrrole, and dioxazine.

(Aqueous Medium)

The ink can contain water or an aqueous medium which is a mixed medium of water and a water-soluble organic solvent. As the water, deionized water or ion exchange water is preferably used. A content (% by mass) of water in the aqueous ink is 50.0% by mass or more to 95.0% by mass or less based on the total mass of the ink. In addition, a content (% by mass) of the water-soluble organic solvent in the aqueous ink is 3.0% by mass or more to 50.0% by mass or less based on the total mass of the ink. As the water-soluble organic solvent, any water-soluble organic solvent usable for inkjet ink such as alcohols, (poly)alkylene glycols, glycol ethers, nitrogen-containing compounds, and sulfur-containing compounds, can be used. Further, one or two kinds or more of these water-soluble organic solvents can be contained in the ink.

(Other Additives)

In addition to the above components, the ink may contain water-soluble organic compounds which are solid at a temperature of 25° C. such as urea and its derivatives, trimethylolpropane, 1,6-hexanediol, and polyethylene glycol having a number average molecular weight of 1,000. In addition, if necessary, the ink may contain various additives such as a surfactant, a defoaming agent, a pH adjusting agent, a viscosity adjusting agent, a rust preventing agent, an antiseptic agent, an antifungal agent, an antioxidant, and a reduction inhibitor. A content (% by mass) of the surfactant is preferably 0.1% by mass or more to 5.0% by mass or less and more preferably 0.2% by mass or more to 3.0% by mass or less based on the total mass of the ink. As the surfactant, it is preferable to use a non-ionic surfactant.

(Physical Properties)

[Brightness]

If the relationship of the brightness of the ink is satisfied, colors of the ink may be different from or the same as each other or any combination of colors. In particular, the colors of the ink are preferably different colors. When the colors are different, black ink, cyan ink, magenta ink, and yellow ink are in the order from smaller brightness to larger brightness. The relationship of the brightness of the ink can be determined by measuring the brightness of the ink diluted with water at an appropriate ratio with a spectrophotometer so as to obtain an absorbance value suitable for measurement, wherein the relation of the brightness of the ink may be changed depending on the content of the coloring material in the ink. When comparing the brightness of a plurality of inks, it is necessary to dilute the plurality of inks with water so as to have the same ratio.

[Viscosity]

It is preferable that the viscosity (mPa·s) of the ink ejected from the ejection orifice arrays arranged on the top in the direction of gravity among the plurality of ejection orifice arrays is 2.0 mPa·s or more. By increasing the viscosity of the ink, it is possible to suppress flowing of the ink ejected from the ejection orifice array along the ejection orifice surface, thereby making it difficult to mix the ink. As a result, it is possible to suppress the change in color tone of the image due to the color mixing of the ink. The viscosity (mPa·s) of each ink ejected from the ejection orifice is more preferably 2.0 mPa·s or more. At the time of recording the image, it is possible to suppress adhesion of ink to the ejection orifice surface due to overflow of ink from the ejection orifice or increase in mist. As a result, it is difficult for the inks to mix, and thus the change in color tone of the image can be further suppressed. The viscosity of the ink is measured using a rotary viscometer. The viscosity (mPa·s) of each ink ejected from the ejection orifice is more preferably 3.0 mPa·s or more to 12.0 mPa·s or less. The viscosity value can be appropriately adjusted depending on the type and amount of the water-soluble organic solvent.

[Surface Tension]

In order to suppress color mixing of the ink, it is important to make it hard for the ink to adhere to the periphery of the ejection orifice at the time of ejecting the ink. Therefore, since a time required from foaming to ejecting the ink is several milliseconds (msec), attention was focused on a dynamic surface tension of the ink at 10 msec as a very short lifetime that can be accurately measured. The dynamic surface tension (mN/m) of the ink at a lifetime of 10 msec is preferably 35 mN/m or more.

When the dynamic surface tension is less than 35 mN/m, it is hard for tension for decreasing a surface area to act on a surface of the ink, such that when the ink is ejected, the ink easily adheres to the periphery of the ejection orifice. As a result, since the ink ejected from the ejection orifice easily flows along the ejection orifice surface, in some cases, the change in color tone of the image cannot be sufficiently suppressed due to color mixing of the ink. The dynamic surface tension is more preferably 48 mN/m or less.

The dynamic surface tension of the ink is measured by a maximum foam pressure method. In this method, surface tension is obtained by immersing a probe (thin tube) in a liquid to be measured and measuring a maximum pressure required to release air bubbles pushed out from a tip portion of the probe. Further, the lifetime is a time required to reach the maximum bubble pressure (a radius of curvature of the air bubble and a radius of the tip portion of the probe are equal to each other) after the air bubble is released and a new surface is formed when the air bubble is formed from the tip portion of the probe.

In addition, static surface tension (mN/m) of the ink is preferably 30 mN/m or more to 40 mN/m or less. The static surface tension of the ink is measured by a Wilhelmy balance method (plate method). A value of the surface tension can be appropriately adjusted depending on the kind and an amount of a surfactant.

EXAMPLE

Hereinafter, the present invention will be described in more detail through Examples, Comparative Examples and Reference Examples, but the present invention is not limited to the following Examples as long as the present invention does not depart from the gist thereof. Further, terms "parts" and "%" with respect to the amount of components are based on mass unless otherwise specified.

<Preparation of Pigment Dispersion Liquid>

To a solution of 5.0 g of concentrated hydrochloric acid dissolved in 5.5 g of water, 1.6 g of 4-amino-1,2-benzenedicarboxylic acid was added at a temperature of 5° C. To maintain the temperature at 10° C. or less, a solution obtained by dissolving 1.8 g of sodium nitrite in 9.0 g of water was added to the solution obtained above while stirring in an ice bath. After stirring for 15 minutes, 6.0 g of carbon black having a specific surface area of 220 $m^2$/g and a DBP oil absorption of 105 mL/100 g was added thereto and mixed. Further, after stirring for 15 minutes, the obtained slurry was filtered with filter paper (standard filter paper No. 2 manufactured by Advantec), and the carbon black was thoroughly washed with water and dried in an oven at 110° C. Water was added to the obtained carbon black to obtain a pigment dispersion liquid in a state in which a self-dispersible pigment in which a —$C_6H_3$—$(COONa)_2$ group was bound to a particle surface of carbon black was dispersed in water (pigment content: 15.0%). Then, a sodium ion of the pigment dispersion liquid was substituted into a potassium ion using an ion exchange method.

<Preparation of Liquid Including Dye>

Liquid including dyes 1 to 3 (dye content: 10.0%) containing C.I. Direct Blue 199 as dye 1, C.I. Acid Red 289 as dye 2, and C.I. Direct Yellow 132 as dye 3, respectively, was obtained.

<Preparation of Ink>

Respective components illustrated in Table 1 were mixed and sufficiently stirred. Then, the mixture was subjected to pressure-filtration using a cellulose acetate filter (manufactured by Advantech Co., Ltd.) having a pore size of 1.2 μm, thereby preparing ink. In the lower part of Table 1, the brightness of the ink and the viscosity of the ink are described. The brightness of the ink was measured by diluting the ink 2,000 times with pure water and measuring brightness L* based on L*a*b* display system defined by Commission internationale de l'eclairage (CIE) under conditions of light source: C and visual field: 2°, using an ultraviolet-visible spectrophotometer (U-3900H manufactured by Hitachi, Ltd.). The viscosity of the ink was measured using a rotary viscometer (RE 80 type viscometer manufactured by Toki Sangyo Co., Ltd.). Acetylenol E100 is a non-ionic surfactant manufactured by Kawaken Fine Chemicals Co., Ltd.

TABLE 1

| | | | | | | | | | | |
|---|---|---|---|---|---|---|---|---|---|---|
| Composition and Properties of Ink | | | | | | | | | | |
| | Ink No. | | | | | | | | | |
| | Black Ink 1 | Black Ink 2 | Black Ink 3 | Black Ink 4 | Black Ink 5 | Cyan Ink 1 | Cyan Ink 2 | Cyan Ink 3 | Magenta Ink 1 | Yellow Ink 1 |
| Pigment Dispersion Liquid | 20.0 | 20.0 | 20.0 | 70.0 | 15.0 | | | | | |
| Liquid Including Dye 1 | | | | | | 40.0 | 40.0 | 40.0 | | |
| Liquid Including Dye 2 | | | | | | | | | 30.0 | |
| Liquid Including Dye 3 | | | | | 5.0 | | | | | 30.0 |
| Glycerin | 15.0 | 16.0 | 15.0 | 15.0 | 15.0 | 15.0 | 16.0 | 15.0 | 15.0 | 15.0 |
| Triethylene glycol | 12.0 | | | | 12.0 | 12.0 | | | 12.0 | 12.0 |

TABLE 1-continued

Composition and Properties of Ink

| | Black Ink 1 | Black Ink 2 | Black Ink 3 | Black Ink 4 | Black Ink 5 | Cyan Ink 1 | Cyan Ink 2 | Cyan Ink 3 | Magenta Ink 1 | Yellow Ink 1 |
|---|---|---|---|---|---|---|---|---|---|---|
| Polyethylene glycol 1000 | | | | 10.0 | | | | | | |
| 1,2-hexanediol | 3.0 | 3.0 | 3.0 | 3.0 | 3.0 | 3.0 | 3.0 | 3.0 | 3.0 | 3.0 |
| Acetylenol E100 | 1.0 | 1.0 | 1.0 | 1.0 | 1.0 | 1.0 | 1.0 | 1.0 | 1.0 | 1.0 |
| Ion Exchange Water | 49.0 | 60.0 | 61.0 | 1.0 | 49.0 | 29.0 | 40.0 | 41.0 | 39.0 | 39.0 |
| Brightness of Ink | 59 | 59 | 59 | 59 | 59 | 77 | 77 | 77 | 79 | 98 |
| Viscosity of Ink (mPa · s) | 3.0 | 2.0 | 1.9 | 7.5 | 3.0 | 3.0 | 2.0 | 1.9 | 2.9 | 3.0 |

<Evaluation>

In the present invention, as the evaluation criteria for evaluation described below, "A" or "B" was set as an acceptable level, and "C" was set as an unacceptable level. Evaluation results are shown in Table 3 below. An ink jet recording apparatus equipped with the recording heads 1 to 9 shown in Table 2 was used for the configuration shown in FIGS. 4A and 4B. In Table 2, ejection orifice arrays of the recording element substrate correspond to the ejection orifice arrays I to IV illustrated in FIGS. 1A to 1C. In recording element substrates of the recording heads 1 to 6, 8 and 9, the ejection orifice arrays overlap each other in a conveying direction of a recording medium, but in a recording element substrate of the recording head 7, the ejection orifice arrays does not overlap each other in the conveying direction of the recording medium. Further, the recording head 5 has the ejection orifice arrays I to III, but the ink is not ejected from the ejection orifice array II.

In the recording heads 1 to 9, the number of ejection orifices per one ejection orifice array was 1024, and a density of the ejection orifices per one ejection orifice array was 600 dpi. In addition, a long diameter (μm) passing through the center of the ejection orifice was 20 μm, and a distance (mm) between adjacent ejection orifice arrays was 0.7 mm. In addition, an ejection orifice surface of the recording head was subjected to water-repellent treatment by a condensate of a hydrolyzable silane compound containing a fluoroalkyl group and a hydrolyzable silane compound containing a cationic polymerizable group.

In Examples, an image recorded under a condition at which three ink droplets (5.0 ng) were applied to a unit area of 1/600 inch×1/600 inch was defined to have a recording duty of 100%, and a conveyance speed of the recording medium was 15 inch/second. In the case of conveying the recording medium in a direction from the ejection orifice array I to the ejection orifice array II ("I→II" in Table 3), at the time of recording the image, the recording medium was conveyed from a bottom to a top in the direction of gravity. In the case of conveying the recording medium in a direction from the ejection orifice array II to the ejection orifice array I ("II→I" in Table 3), at the time of recording the image, the recording medium was conveyed from the top to the bottom in the direction of gravity.

TABLE 2

Configuration of Recording Head

| | | Recording Head No. | | | | | | | | |
|---|---|---|---|---|---|---|---|---|---|---|
| | | 1 | 2 | 3 | 4 | 5 | 6 | 7 | 8 | 9 |
| Structure of Recording Element Substrate of 1 | Ejection Orifice Array IV | Absence | Absence | Presence | Presence | Absence | Absence | Absence | Absence | Absence |
| | Ejection Orifice Array III | Absence | Presence | Presence | Presence | Presence | Absence | Absence | Absence | Absence |
| | Ejection Orifice Array II | Presence | Presence | Presence | Presence | Presence | Presence | Presence | Presence | Presence |
| | Ejection Orifice Array I | Presence | Presence | Presence | Presence | Presence | Presence | Presence | Presence | Presence |
| The Number of Recording Element Substrates Included in Recording Head | | 15 | 15 | 15 | 15 | 15 | 15 | 15 | 15 | 15 |
| Arrangement Manner of Recording Element Substrate | | FIG. 3B | FIG. 3B | FIG. 3B | FIG. 3B | FIG. 3B | FIG. 3B | FIG. 3B | FIG. 3B | FIG. 3A |
| Angle (°) between Ejection Orifice Surface and Gravity Direction | | 45 | 45 | 45 | 90 | 45 | 90 | 45 | 0 | 45 |

(Change in Color Tone of Image)

First, a single color solid image (about 3 cm in the conveying direction of the recording medium×about 4 cm in the depth direction of the apparatus) having a recording duty of 100% was recorded using each of the inks. The obtained image was used as an evaluation image 1. Then, a solid image having a plurality of colors (about 29 cm in the conveying direction of the recording medium×about 4 cm in the depth direction of the apparatus) was continuously recorded on 100 sheets using each of the inks so that the recording duty of each of the inks was the same and a total recording duty of the inks was 100%. In addition, similar to a case before 100 sheets of the images were continuously recorded, a single color solid image (about 3 cm in the conveying direction of the recording medium×about 4 cm in the depth direction of the apparatus) having a recording duty of 100% was recorded using each of the inks. The obtained image was used as an evaluation image 2. As the recording medium, plain paper (HR-101 manufactured by Canon Inc.) was used.

By using a spectrophotometer (Spectrolino manufactured by Macbeth), L*, a*, and b* of the single color solid image in the evaluation image 1 and the evaluation image 2 were measured. L*, a*, and b* are based on the L*a*b* display system defined by Commission internationale de l'éclairage (CIE). In the evaluation image 1, L*, a*, and b* were measured ten times by arbitrarily changing the measurement position in the solid image with respect to one kind of solid image, and an average value thereof was regarded as L*1, a*i, and b*i. Further, in the evaluation image 2, L*, a*, and b* were also measured ten times with respect to one kind of solid image in the same manner, and an average value thereof was regarded as L*2, a*2, and b*2. In addition, in the same kind of solid image of in the evaluation image 1 and the evaluation image 2, the color difference ΔE was calculated from Equation of $\Delta E = \{(L^*_2 - L^*_1)^2 + (a^*_2 - a^*_1)^2 + (b^*_2 - b^*_1)^2\}^{1/2}$. Since plural kinds of solid images were recorded, an average value of ΔE was taken. As the ΔE was smaller, the color mixing of the image was difficult to be noticeable.

A: ΔE was less than 2.
B: ΔE was 2 or more to less than 4.
C: ΔE was 4 or more.

(Image Unevenness)

A solid image having a plurality of colors (about 3 cm in the conveying direction of the recording medium×about 4 cm in the depth direction of the apparatus) was recorded using each of the inks so that the recording duty of each of the inks was the same and a total recording duty of the inks was 100%. As the recording medium, plain paper (HR-101 manufactured by Canon Inc.) was used. The images were visually observed to evaluate the image unevenness.

A: Image unevenness was not noticed.
C: Image unevenness was noticed.

TABLE 3

Evaluation Results

| | Evaluation Conditions | | | | | | Evaluation Result | |
|---|---|---|---|---|---|---|---|---|
| | Conveying Direction of Recording Medium | Recording Head No. | Kind of Ink of Ejection Orifice Array I | Kind of Ink of Ejection Orifice Array II | Kind of Ink of Ejection Orifice Array III | Kind of Ink of Ejection Orifice Array IV | Change in Color Tone of Image | Image Unevenness |
| Example 1 | I→II | 1 | Black Ink 1 | Cyan Ink 1 | — | — | A | A |
| Example 2 | I→II | 1 | Black Ink 5 | Cyan Ink 1 | — | — | A | A |
| Example 3 | I→II | 8 | Black Ink 1 | Cyan Ink 1 | — | — | A | A |
| Example 4 | I→II | 1 | Black Ink 1 | Magenta Ink 1 | — | — | A | A |
| Example 5 | I→II | 1 | Black Ink 1 | Yellow Ink 1 | — | — | A | A |
| Example 6 | I→II | 1 | Cyan Ink 1 | Magenta Ink 1 | — | — | A | A |
| Example 7 | I→II | 1 | Cyan Ink 1 | Yellow Ink 1 | — | — | A | A |
| Example 8 | I→II | 1 | Magenta Ink 1 | Yellow Ink 1 | — | — | A | A |
| Example 9 | I→II | 2 | Black Ink 1 | Cyan Ink 1 | Magenta Ink 1 | — | A | A |
| Example 10 | I→II | 2 | Black Ink 1 | Cyan Ink 1 | Yellow Ink 1 | — | A | A |
| Example 11 | I→II | 2 | Cyan Ink 1 | Magenta Ink 1 | Yellow Ink 1 | — | A | A |
| Example 12 | I→II | 2 | Cyan Ink 1 | Magenta Ink 1 | Black Ink 1 | — | B | A |
| Example 13 | I→II | 3 | Black Ink 1 | Cyan Ink 1 | Magenta Ink 1 | Yellow Ink 1 | A | A |
| Example 14 | I→II | 3 | Black Ink 1 | Yellow Ink 1 | Magenta Ink 1 | Magenta Ink 1 | B | A |
| Example 15 | I→II | 3 | Black Ink 1 | Magenta Ink 1 | Yellow Ink 1 | Magenta Ink 1 | B | A |
| Example 16 | I→II | 1 | Black Ink 4 | Cyan Ink 1 | — | — | A | A |
| Example 17 | I→II | 1 | Black Ink 2 | Cyan Ink 2 | — | — | A | A |
| Example 18 | I→II | 1 | Black Ink 2 | Cyan Ink 3 | — | — | B | A |
| Example 19 | I→II | 1 | Black Ink 3 | Cyan Ink 3 | — | — | B | A |
| Example 20 | II→I | 1 | Black Ink 1 | Cyan Ink 1 | — | — | A | A |
| Comparative Example 1 | I→II | 1 | Cyan Ink 1 | Black Ink 1 | — | — | C | A |
| Comparative Example 2 | I→II | 1 | Magenta Ink 1 | Black Ink 1 | — | — | C | A |
| Comparative Example 3 | I→II | 1 | Yellow Ink 1 | Black Ink 1 | — | — | C | A |

TABLE 3-continued

Evaluation Results

| | Evaluation Conditions | | | | | Evaluation Result | |
|---|---|---|---|---|---|---|---|
| | Conveying Direction of Recording Medium | Recording Head No. | Kind of Ink of Ejection Orifice Array I | Kind of Ink of Ejection Orifice Array II | Kind of Ink of Ejection Orifice Array III | Kind of Ink of Ejection Orifice Array IV | Change in Color Tone of Image | Image Unevenness |
| Comparative Example 4 | I→II | 1 | Magenta Ink 1 | Cyan Ink 1 | — | — | C | A |
| Comparative Example 5 | I→II | 1 | Yellow Ink 1 | Cyan Ink 1 | — | — | C | A |
| Comparative Example 6 | I→II | 1 | Yellow Ink 1 | Magenta Ink 1 | — | — | C | A |
| Comparative Example 7 | I→II | 8 | Cyan Ink 1 | Black Ink 1 | — | — | C | A |
| Comparative Example 8 | I→II | 2 | Magenta Ink 1 | Cyan Ink 1 | Black Ink 1 | — | C | A |
| Comparative Example 9 | I→II | 2 | Yellow Ink 1 | Cyan Ink 1 | Black Ink 1 | — | C | A |
| Comparative Example 10 | I→II | 2 | Yellow Ink 1 | Magenta Ink 1 | Cyan Ink 1 | — | C | A |
| Comparative Example 11 | I→II | 3 | Yellow Ink 1 | Magenta Ink 1 | Cyan Ink 1 | Black Ink 1 | C | A |
| Comparative Example 12 | I→II | 9 | Cyan Ink 1 | Yellow Ink 1 | — | — | A | C |
| Reference Example 1 | I→II | 4 | Black Ink 1 | Cyan Ink 1 | Magenta Ink 1 | Yellow Ink 1 | A | A |
| Reference Example 2 | I→II | 4 | Yellow Ink 1 | Magenta Ink 1 | Cyan Ink 1 | Black Ink 1 | A | A |
| Reference Example 3 | I→II | 1 | Black Ink 1 | Black Ink 1 | — | — | A | A |
| Reference Example 4 | I→II | 5 | Black Ink 1 | — | Cyan Ink 1 | — | A | A |
| Reference Example 5 | I→II | 6 | Black Ink 1 | Cyan Ink 1 | — | — | A | A |
| Reference Example 6 | I→II | 6 | Cyan Ink 1 | Black Ink 1 | — | — | A | A |
| Reference Example 7 | I→II | 7 | Black Ink 1 | Cyan Ink 1 | — | — | A | A |
| Reference Example 8 | I→II | 7 | Cyan Ink 1 | Black Ink 1 | — | — | A | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-201259, filed Oct. 17, 2017, and Japanese Patent Application No. 2018-180362 filed Sep. 26, 2018, which are hereby incorporated by reference herein in their entirety.

What is claimed is:

1. An ink jet recording method using an ink jet recording apparatus that includes (i) a first ink and a second ink that are each aqueous inks, and (ii) a recording head including a plurality of recording element substrates in which a first ejection orifice array for ejecting the first ink and a second ejection orifice array for ejecting the second ink are sequentially arranged from the bottom up in the direction opposite to the direction of gravity to be adjacent to each other and arranged to at least partially overlap each other in a conveying direction of a recording medium, wherein the plurality of recording element substrates are arranged to be adjacent to each other in an arrangement direction of the first ejection orifice array and the second ejection orifice array, the ink jet recording method comprising:

a recording step of ejecting an aqueous ink from the recording head disposed so that an angle formed between an ejection orifice surface of the recording head and the direction of gravity is 0° or more to less than 90° to record an image on the recording medium, wherein the ejection orifice surface is parallel to the direction of gravity when the angle is 0°, wherein a brightness of the first ink, which is ejected from the first ejection orifice array, is lower than a brightness of the second ink, which is ejected from the second ejection orifice array that is disposed upward from the first ejection orifice array with respect to the direction opposite to the direction of gravity.

2. The ink jet recording method according to claim 1, wherein a third ejection orifice array for ejecting a third ink that is an aqueous ink is further arranged at a position adjacent to the second ejection orifice array of the recording head, wherein the second ejection orifice array and the third ejection orifice array are arranged to at least partially overlap each other in the conveying direction of the recording medium, and wherein the brightness of the second ink is lower than a brightness of the third ink.

3. The ink jet recording method according to claim 2, wherein a fourth ejection orifice array for ejecting a fourth ink that is an aqueous ink is further arranged at a position adjacent to the third ejection orifice array of the recording head,
  wherein the third ejection orifice array and the fourth ejection orifice array are arranged to at least partially overlap each other in the conveying direction of the recording medium, and
  wherein the brightness of the third ink is lower than a brightness of the fourth ink.

4. The ink jet recording method according to claim 1, wherein a viscosity (mPa·s) of the aqueous ink is 2.0 mPa·s or more.

5. The ink jet recording method according to claim 1, wherein an angle formed between the ejection orifice surface of the recording head and the direction of gravity is 10° or more to 80° or less.

6. The ink jet recording method according to claim 1, wherein an angle formed between the ejection orifice surface of the recording head and the direction of gravity is 30° or more to 60° or less.

7. The ink jet recording method according to claim 1, wherein the conveying direction of the recording medium is from the first ejection orifice array to the second ejection orifice array.

8. The ink jet recording method according to claim 1, wherein the ejection orifice surface is subjected to a water-repellent treatment.

9. The ink jet recording method according to claim 1, wherein the recording head includes a single recording element substrate in which the first and second ejection orifice arrays are arranged.

10. An ink jet recording apparatus comprising:
(a) a first ink and a second ink that are each aqueous inks; and
(b) a recording head including a plurality of recording element substrates in which a first ejection orifice array for ejecting the first ink and a second ejection orifice array for ejecting the second ink are sequentially arranged from the bottom up in the direction opposite to the direction of gravity to be adjacent to each other and arranged to at least partially overlap each other in a conveying direction of a recording medium, wherein the plurality of recording element substrates are arranged to be adjacent to each other in an arrangement direction of the first ejection orifice array and the second ejection orifice array,
wherein an aqueous ink is ejected from the recording head that is disposed so that an angle formed between an ejection orifice surface of the recording head and the direction of gravity is 0° or more to less than 90° to record an image on the recording medium, wherein the ejection orifice surface is parallel to the direction of gravity when the angle is 0°, and
wherein a brightness of the first ink, which is ejected from the first ejection orifice array, is lower than a brightness of the second ink, which is ejected from the second ejection orifice array that is disposed upward from the first ejection orifice array with respect to the direction opposite to the direction of gravity.

* * * * *